United States Patent [19]
Johnston

[11] Patent Number: 6,002,779
[45] Date of Patent: Dec. 14, 1999

[54] AUTOMATED VOICE MESSAGE SYSTEM AND METHOD

[76] Inventor: William R. Johnston, P.O. Box 39026, Montera, Calif. 94039

[21] Appl. No.: 08/942,985

[22] Filed: Oct. 2, 1997

[51] Int. Cl.$^6$ ...................................................... H04B 3/00
[52] U.S. Cl. ................................................ 381/80; 379/73
[58] Field of Search ................................. 381/77, 78, 79, 381/81, 80; 379/73

[56] References Cited

U.S. PATENT DOCUMENTS

| | | | |
|---|---|---|---|
| 3,811,025 | 5/1974 | Bach | 200/317 |
| 4,275,274 | 6/1981 | English . | |
| 4,884,067 | 11/1989 | Nordholm et al. . | |
| 4,912,457 | 3/1990 | Ladd . | |
| 4,937,408 | 6/1990 | Hattori et al. | 200/314 |
| 5,460,228 | 10/1995 | Butler . | |
| 5,532,680 | 7/1996 | Ousborne . | |
| 5,606,624 | 2/1997 | Damato . | |
| 5,748,709 | 5/1998 | Sheerin | 379/88 |

*Primary Examiner*—Ping Lee
*Attorney, Agent, or Firm*—Kevin H. Fortin, Esq.

[57] ABSTRACT

A recipient-specific voice message playback system detects the presence of a message recipient, identifies the recipient, and plays a message addressed to the recipient. The system includes a recorder. The recorder has multiple channels for recording voice messages. Each channel is assigned to a particular message recipient. A controller couples to the recorder and generates a control signal to regulate message recordation and playback on each channel. A switch also couples to the controller and is associated with each channel. Each switch directs the controller to selectively playback or record a message on each associated channel. The playback system includes a sensor and an alarm. The sensor detects the presence of a recipient and causes the alarm to notify the recipient when a message has been recorded. Actuation of a particular switch identifies a particular recipient and accesses the channel assigned to the particular recipient.

7 Claims, 4 Drawing Sheets

6,002,779

AUTOMATED VOICE MESSAGE SYSTEM AND METHOD

FIELD OF THE INVENTION

This invention relates to automated voice message systems. More particularly, this invention relates to message playback systems and methods which direct messages to specifically identifiable recipients.

BACKGROUND OF THE INVENTION

Automated message playback systems have been developed which detect the presence of a person and respond by playing an audio message. Such systems have proven useful in a variety of contexts. For example, automated message playback systems may be used by real estate sales people to inform prospective home buyers about particular aspects of the home to be sold. At trade shows, a booth may be equipped with an audio/video message playback system to provide product information. Fire extinguishers and exit signs may be equipped with message playback systems to provide safety instructions in times of emergency. Home and business security systems may be equipped with audible message playback systems to deter crime. Many other applications for automated message playback systems exist.

One common aspect of such automated message playback systems is the ability of the system to detect the presence of a person. Various motion sensor types have been used to detect those in the vicinity of the message playback system.

An example of an automated message playback system which detects the presence of a message recipient is disclosed in U.S. Pat. No. 4,912,457 to Ladd, the disclosure of which is incorporated herein by reference. The Ladd invention detects message recipients by first establishing a desired detection range. The detection range is dynamically programmable. When a person, for example, enters the detection range, the sensor detects the presence of the person and a message automatically plays.

Removable EPROM message cartridges store the recorded messages. The cartridges have up to four separate recording channels. To record a new message the cartridges are removed and programmed with the new message using known EPROM programming techniques.

Once a cartridge is programmed and in use, a switch selects a channel, or sequence of channels, to play a message. However, the Ladd invention makes no provision for identifying the message recipient or selecting which message to play based on the identity of the recipient.

The feature of multiple message playback is employed by Butler in U.S. Pat. No. 5,460,228, the disclosure of which is incorporated herein by reference. Butler discloses a fire-extinguisher which relies on a voice synthesizer chip and multiple sensors to play an appropriate message in response to detection of heat, motion, etc. Butler teaches how multiple messages can be played to provide instructions to a fire-extinguisher user. Butler, however, does not teach how to identify a particular recipient to play a particular message to that recipient.

Some message playback systems include an audio and video presentation. The use of a proximity sensor to detect a person initiates the presentation. Such a system is disclosed by Damato in U.S. Pat. No. 5,606,624. Damato uses a personal computer in combination with a sensor to initiate and play the presentation, but does not offer customized presentations which may be addressed to a particular recipient.

What is desired is a system which addresses custom recorded messages to an intended recipient, so that the system can be used in a household, office or other location having multiple identifiable message recipients.

SUMMARY OF THE INVENTION

A recipient-specific voice message playback system detects the presence of a message recipient, identifies the recipient, and plays a message addressed to the recipient. The system includes a recorder. The recorder has multiple channels for recording voice messages. Each channel is assigned to a particular message recipient.

A controller couples to the recorder and generates a control signal to regulate message recordation and playback on each channel. A switch also couples to the controller and is associated with each channel. Each switch is labeled with an ID tag for identifying the recipient to which the channel is assigned. The switch plays or records messages. Actuation of a particular switch identifies a particular recipient according to the ID tag and accesses the channel assigned to the particular recipient.

The playback system includes a sensor and an alarm. The sensor detects the presence of a recipient and causes the alarm to notify the recipient when a message has been recorded.

Accordingly, the system of the present invention is operable as a stand alone system, in conjunction with a conventional answering machine, and in conjunction with a comprehensive telephone answering system.

BRIEF DESCRIPTION OF THE DRAWING

For a further understanding of the advantages of the present invention, reference should be given to the following detailed description, taken in conjunction with the accompanying drawing, in which like parts have like reference numerals and wherein.

DETAILED DESCRIPTION

Figure 1:
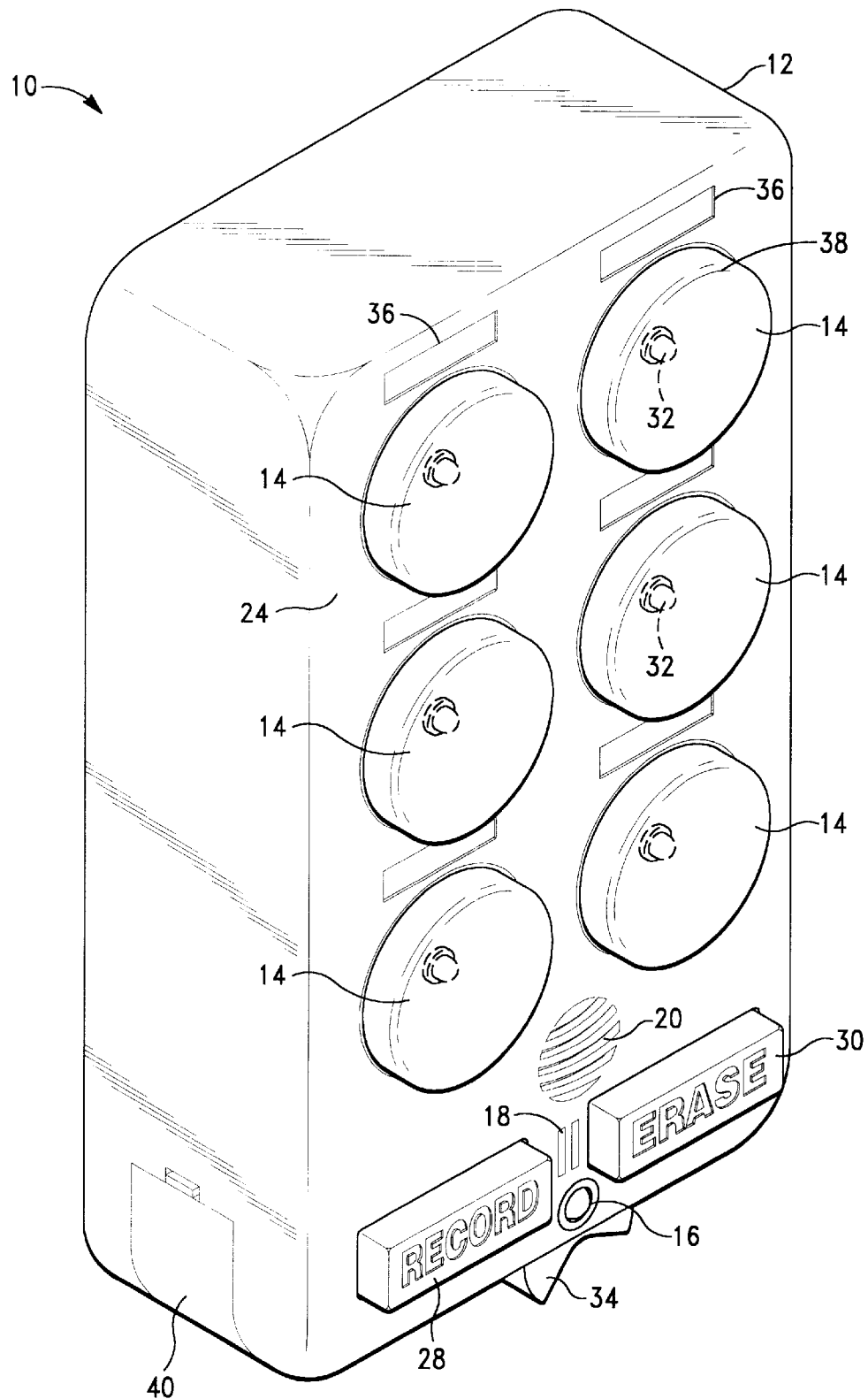
FIG. 1 is a perspective view of a voice message playback device in accordance with the present invention.

FIG. 1 shows a voice message playback system generally designated with the reference numeral 10. The playback system 10 includes a recorder 12, a number of switches 14, a sensor 16, a microphone 18 and a speaker 20. The recorder 12 has multiple channels for recording voice messages. Each channel is assigned to a particular recipient.

The sensor 16 detects the presence of a prospective message recipient, i.e. a person within the vicinity of the system. According one aspect of the invention, the sensor 16 detects motion within a predetermined range. According to another aspect of the invention, the sensor 16 includes a passive infrared detector having a variable range.

The speaker 20 generates an alarm which sounds when the presence of a recipient is detected. Accordingly, the sensor 16 causes the alarm to notify the recipient when a message has been recorded.

Actuation of a particular switch 14 identifies the recipient to the system 10. Action of a particular switch 14 also accesses the channel associated with the particular recipient to replay a message which is directed to the particular recipient.

The recorder has a message selector panel 24. The switches 14 extend from the message selector panel 24. The switches 14, according to one aspect of the invention, are translucent and color-coded. Each switch includes a light source 32 for selectively illuminating the switch 14. According to one aspect of the invention, each switch 14 has a rounded edge 38 and a generally convex configuration to disperse light. The light source 32 includes a LED mounted centrally within each switch.

The message selector panel 24 includes ID tags 36 which attach to the panel 24, adjacent each switch 14. Each ID tag 36 corresponds with the adjacent switch and associates each switch with a person i.e. a prospective message recipient. Normally, a message recipient accesses only the switch 14 corresponding with his or her ID tag 36.

The light source 32 on a particular switch 14 illuminates when a message has been recorded on the channel associated with the particular switch 14. Actuation of the particular illuminated switch 14 plays a message from the channel assigned to the particular recipient.

Each channel is capable of recording multiple messages for a particular recipient. Each switch illuminates in response to a recorded message on the channel associated with the switch. The switch illuminates continuously when a single message is recorded. When multiple messages are recorded for a particular recipient, the switch illuminates periodically to indicate that multiple messages are recorded.

The message selector panel 24 includes a record button 28 and an erase button 30 which mount on the message selector panel 24. The record button 28 couples to the voice message system 10 for recording messages. Simultaneous depression of the record button 28 and a particular switch 14 enables recordation of a message on the channel associated with the particular switch 14. Simultaneous depression of the erase button 30 and a particular switch 14 erases a message on the channel associated with the particular switch 14.

The speaker 20 and sensor 16 mount on the message selector panel 24 and cooperate to notify a recipient of a recorded message. The speaker 20 generates an audible tone to notify a recipient. The speaker 20 also includes a power switch 34 to selectively enable and disable the audible tone. Disablement of the audible tone causes the system to operate silently. During silent operation the light sources function to quietly notify prospective recipients of recorded voice messages.

The system 10 includes a battery holder 40 so that the system is battery powered. The battery holder 40 enables the system 10 to be wall mounted at any convenient location. A power outlet is not required. In an alternate embodiment, the system 10 is powered by an alternating current source.

Wall mounted systems 10 are particularly useful in a home where several family members are regular message recipients. Each family member may be assigned a button 14 which is labeled with an ID tag 36 for that family member. Accordingly, the light source illuminates a button for a family member who has been left a message. Recipient-specific recorded messages are recorded and played.

Figure 2:
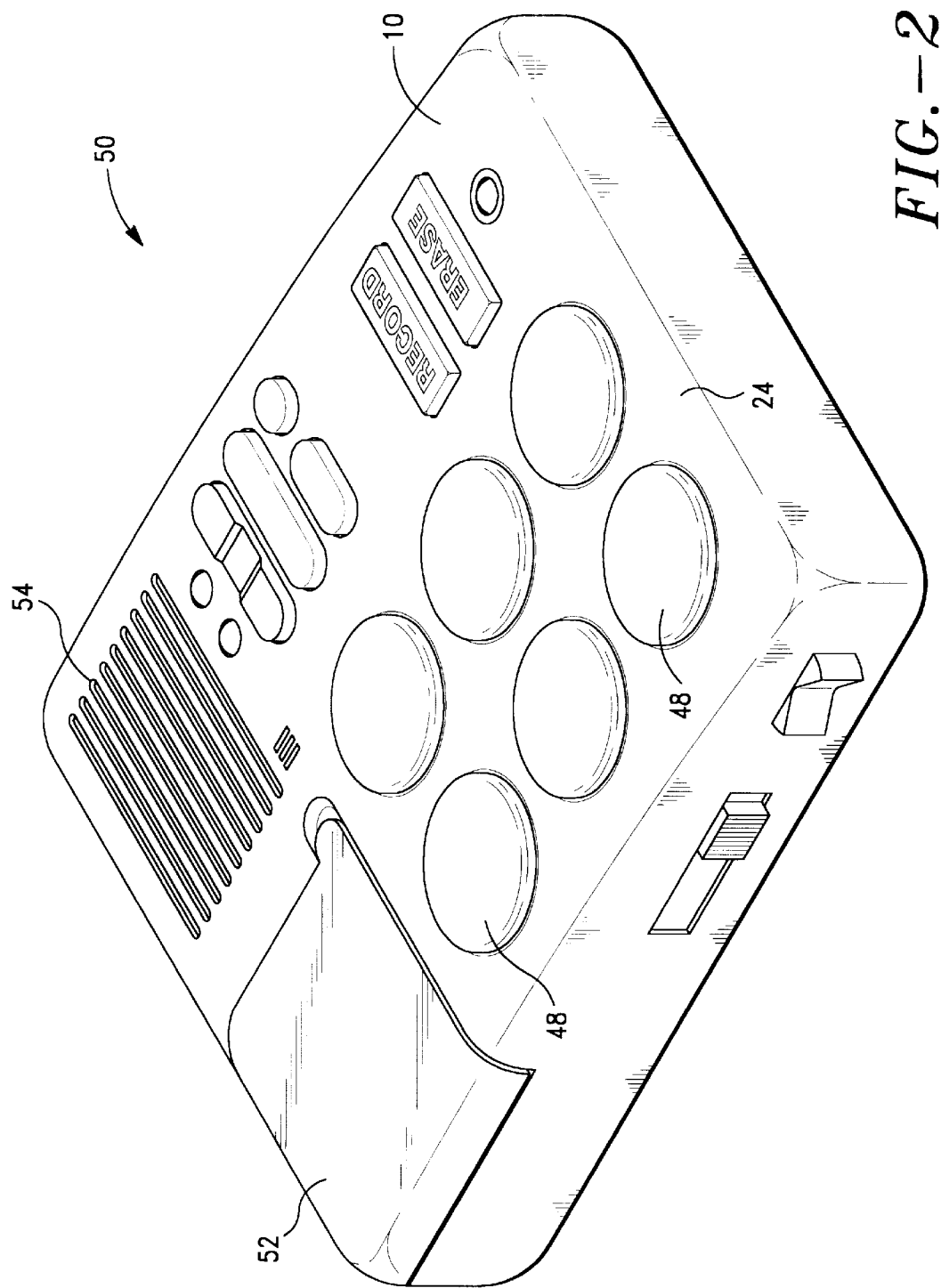
FIG. 2 is a perspective view of an answering machine incorporating the system of FIG. 1.

FIG. 2 shows a telephone answering machine generally designated with the reference numeral 50. The answering machine 50 includes a micro-cassette player unit 52, and a speaker 54. The machine 50 incorporates the playback system 10 with the message selector panel 24. The answering machine 50 plugs into a conventional phone line and telephone handset to receive, record and playback phone messages.

The panel 24 has multiple translucent and color-coded buttons 48 attached to the recipient identification panel, each button 48 includes a light source for illuminating the button 48. It can be appreciated that although the panel includes illuminated buttons 48, the buttons could be replaced with a graphics interface or other illuminated display.

Figure 3:
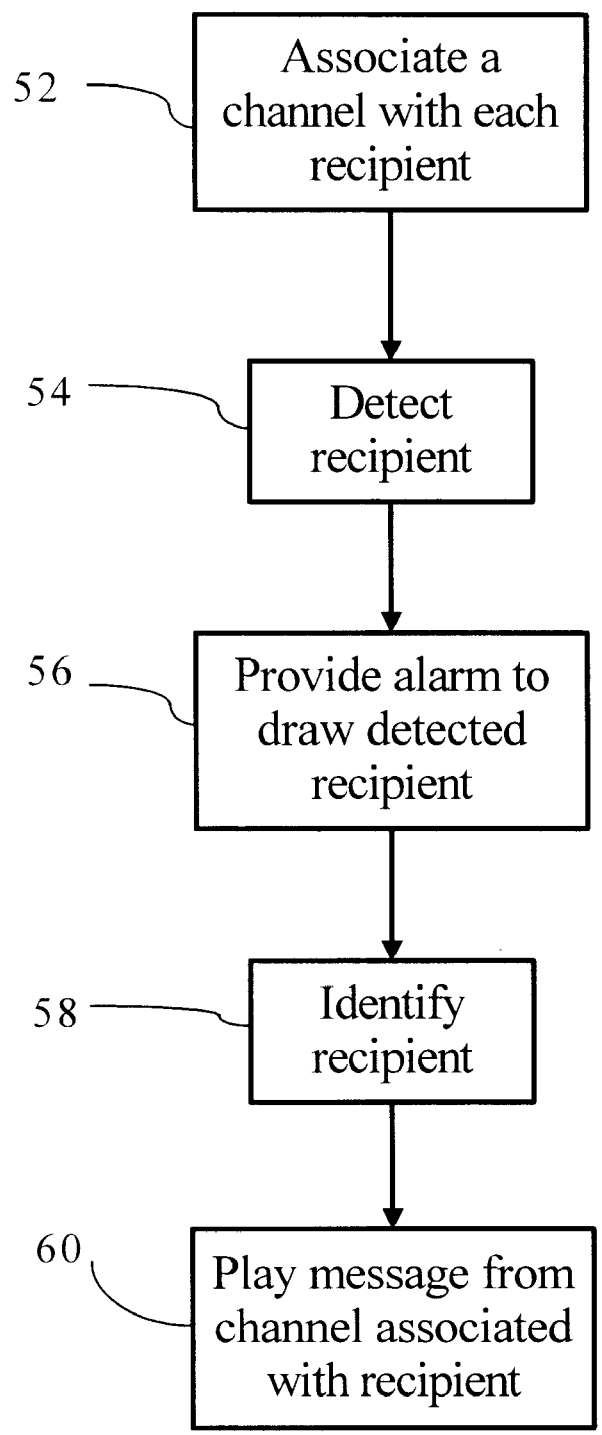
FIG. 3 is a method in accordance with the present invention.

FIG. 3 shows a method of playing a voice message to a recipient. The method includes the step 52 of associating a channel for each recipient; the step 54 of detecting the presence of a recipient; the step 56 of providing an alarm to draw the detected recipient; the step 58 of identifying the recipient; and the step 60 of playing a pre-recorded message from the channel associated with the recipient.

The step 52 includes programming a recorder with at least one voice message. The voice message is addressed to a particular recipient. The recorder stores the voice message until the particular recipient access the recorder and plays the voice message.

When multiple messages are programmed, one channel is used to record each message. Each message is addressed to a particular recipient Accordingly, each channel is associated with a particular recipient.

The step 54 of detecting the recipient can be accomplished in any of a number of ways including with a motion detector, heat detector or other conventional devices for detecting the presence of a person. When the person i.e. a prospective message recipient enters the detected area, the system responds by providing a tone, voice invitation, illuminated alarm or other response to inform the prospective recipient that a message has been recorded.

The step 56 of providing an alarm is accomplished by delivering a tone to the prospective recipient via a speaker. The alarm is selectively enabled and disabled. When enabled, the alarm sounds upon the occurrence of two conditions: a message is recorded; and the presence of a person is detected.

It can be appreciated that the alarm may include audio, video and vibrational notifications to inform the prospective recipient that a message has been recorded.

According to one aspect of the invention, the detector performs the step 58 of identifying the recipient via a badge, optical characteristic, voice recognition, or with a key code entry. Upon recognition of the message recipient, any message addressed to the detected person plays automatically.

According to a preferred aspect of the invention, the step 58 of identifying the recipient includes providing keypad interface. More particularly, an interface having an illuminated switch is provided for each channel. Actuation of a particular illuminated switch identifies the recipient associated with a particular channel.

Figure 4:
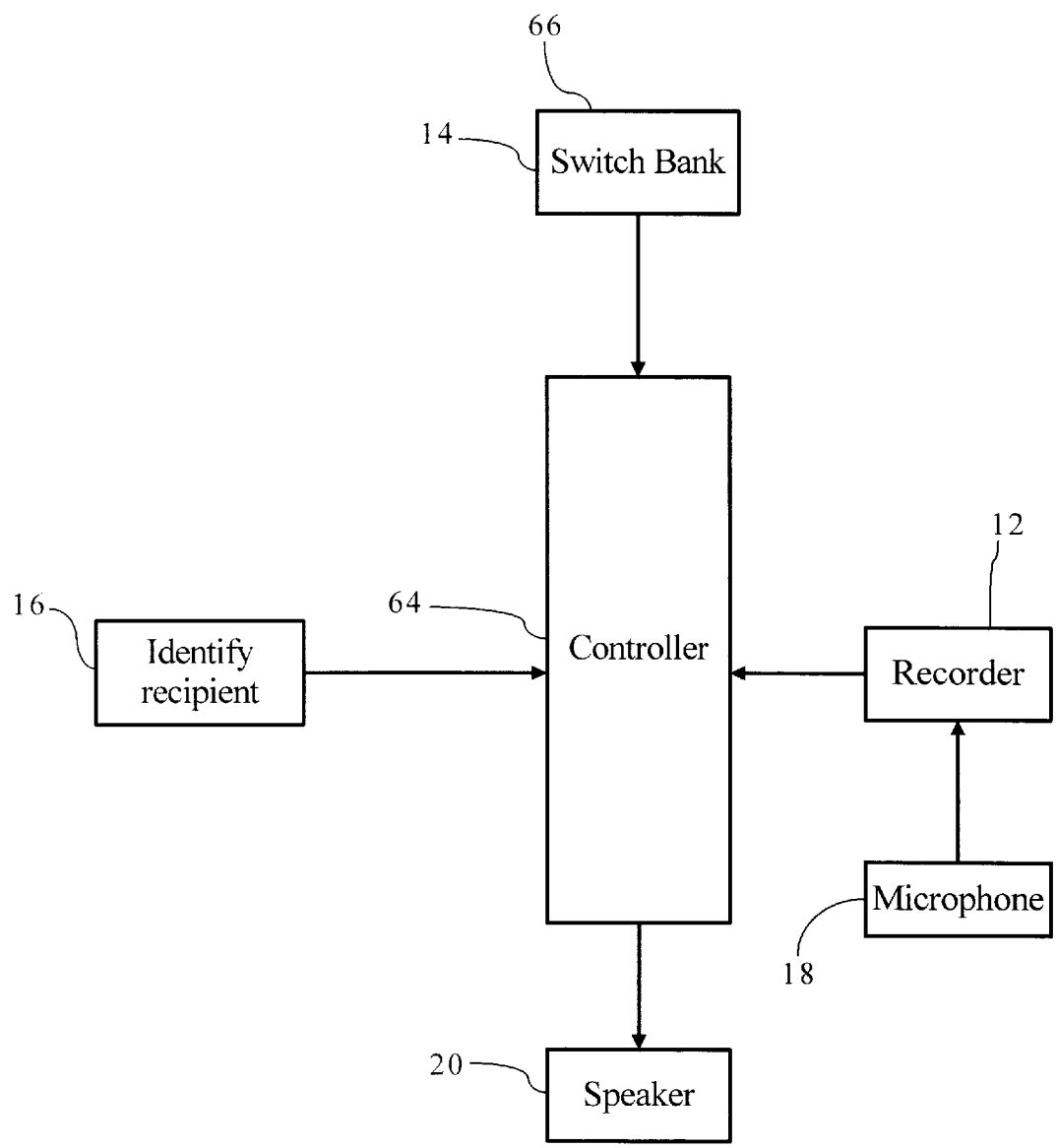
FIG. 4 is a layout diagram of a system in accordance with the present invention.

FIG. 4 shows a system in accordance with the present invention. The system includes a controller 64, the sensor 16, the speaker 20, a bank 66 of switches 14, a recorder 12 and a microphone 18.

The sensor 16 and speaker 20 couple to the controller 64. The sensor 16 detects the presence of a recipient and sends a signal to the controller 64. The recorder 12 couples to the controller and signals the controller 64 when a message is recorded. The controller 64, in turn, sends a signal to the speaker 20 in response to message recordation recipient detection. The signal from the controller 64 to the speaker 20 is an alarm which draws the recipient closer to the recorder 12.

The switch bank 66 includes switches 14 which enable a person, i.e. a message recipient, to select which message the recorder 2 will play. Actuation of a particular switch 14 identifies the recipient to the controller and selects a particular message to play. The controller 64 sends a signal to the speaker 20 to replay the particular message to the particular recipient. Accordingly, the message is accessed only by the recipient to which the message is addressed.

The recorder 12 has multiple mailboxes for recording messages. The system answers each call with a greeting. The greeting presents choices for each mailbox so that the caller can choose which mailbox to access. The greeting can include a recipient name and an instruction for leaving a message for the recipient. An example of an instruction and recipient name includes: "Press 1 to record a message for Bob; Press 2 to record a message for Alice". Accordingly, a response to a greeting such as a keypad entry directs the incoming call to a particular mailbox. Each mailbox is readily accessed by actuating a switch associated with the particular mailbox.

The microphone 18 couples to the recorder 12 to enable a person to readily record personalized messages which are directed to a particular recipient.

While the foregoing detailed description has described several embodiments in accordance with the present invention, the reader should understand that the above description is illustrative only and not limiting of the disclosed invention. It will be appreciated that the embodiments discussed above and the virtually infinite embodiments that are not mentioned could easily be within the scope and spirit of this invention. Thus, the invention is to be limited only by the claims as set forth below.

I claim:

1. A voice message playback system comprising:
   a recorder having multiple channels, each channel being associated with a particular recipient, the recorder operative to record and playback messages on each channel for the associated recipient;
   a controller coupled to the recorder operative to control message recording and playback;
   a sensor coupled to the controller operative to detect presence of a recipient and generate a notification signal in response to a recorded message when a recipient is detected;
   a message selector panel;
   multiple switches attached to the message selector panel each switch being associated with a particular channel, the switches being coupled to the controller and operative to playback a message from the channel associated with a particular recipient in response to actuation by the particular recipient;
   each switch being translucent and colored to improve visibility;
   a light source included in each switch to illuminate in response to a recorded message on the channel associated with the switch so that the switch illuminates when a message is recorded for a particular recipient;
   the light source illuminates continuously when a single message is recorded and periodically when multiple messages are recorded;
   actuation of the switch associated with a particular recipient is accomplished by the recipient pressing the switch to identify the particular recipient to cause message playback to be recipient-specific
   wherein the voice message playback system, is a stand alone system not coupled with a telephone or telephone answering machine in operation.

2. A system as set forth in claim 1, wherein the light source is an LED mounted centrally within each switch, each switch has a rounded edge an a generally convex configuration to disperse light from the light source.

3. A system as set forth in claim 1, wherein the system includes a speaker coupled to the controller, the notification signal is an audio signal directed to the speaker to sound an alarm when a recipient is detected by the sensor.

4. A system as set forth in claim 3, wherein the system includes a power switch which regulates power to the speaker to selectively enable silent operation of the system.

5. A system as set forth in claim 1 further comprising a record button, simultaneous depression of the record button and a particular switch enables recordation of a message on the channel associated with the particular switch.

6. A system as set forth in claim 1 further comprising an erase button, simultaneous depression of the erase button and a particular switch enables erasure of a message on the channel associated with the particular switch.

7. A system as set forth in claim 1, wherein the system includes a message selector panel, ID tags attach to the message selector panel adjacent each switch, each tag corresponds with the adjacent switch and associates each switch with a message recipient.

* * * * *